United States Patent [19]

Stout

[11] 3,787,827

[45] Jan. 22, 1974

[54] REAL TIME DATA COMPRESSION SYSTEM

[75] Inventor: Karl J. Stout, Lyndhurst, Ohio

[73] Assignee: Ohio Nuclear, Inc., Mentor, Ohio

[22] Filed: Oct. 5, 1972

[21] Appl. No.: 295,200

Related U.S. Application Data

[62] Division of Ser. No. 168,845, Aug. 4, 1971.

[52] U.S. Cl. .......................... 340/174.1 P, 340/172.5

[51] Int. Cl. ............................................ G11b 5/00

[58] Field of Search 340/174.1 P, 174.1 L, 174.1 G, 340/174.1 H, 172.5; 179/100.2 MD, 100.2 S

[56] References Cited

UNITED STATES PATENTS

| | | | |
|---|---|---|---|
| 3,316,544 | 4/1967 | Anderson | 340/174.1 P |
| 3,173,135 | 3/1965 | Felts | 340/174.1 P |
| 3,533,071 | 10/1970 | Epstein | 340/174.1 L |
| 3,439,344 | 4/1969 | Stagnz | 340/172.5 |
| 3,366,924 | 1/1968 | Brown | 340/172.5 |
| 3,480,931 | 11/1969 | Geissler et al. | 340/172.5 |

*Primary Examiner*—Vincent P. Canney
*Attorney, Agent, or Firm*—Fay, Sharpe and Mulholland

[57] ABSTRACT

A real time data compression recording system particularly adapted for use in recording randomly-generated analog data. The system preferably comprises an endless loop tape transport system having a plurality of data recording tracks and a plurality of tracks containing information for controlling and monitoring the recording of the data. A clock track contains a recorded clock signal from a signal generator. The clock signal in the readout mode is divided into a lower frequency signal for recording a pass signal on a pass track on the tape to separate the endless tape into a plurality of data spaces. A layout signal on a layout track of the tape indicates whether data has been stored in a corresponding data space. A transfer signal is provided on the transfer track of the tape as a function of the layout signal and the pass signal to control the transfer of data to the tape. Input data are stored in an input data storage means to be read out for recording on the data tracks of the tape upon command from a signal from a storage control means. A gate means in circuit with the storage control means when enabled causes data to be stored on the data tracks when a signal from the data storage means indicates that data are present and available for recording. When data are read out of the input storage means, a signal is recorded on the layout track and the signal in the layout track is used in the readout cycle to prevent recording of additional data in a particular data space on subsequent passes of the tape. Since the pass signal when read out indicates the presence of a data space on the tape and the presence of a layout signal indicates that data has been stored in that space, the pass signal and the layout signal are used in the readout mode to record a transfer signal on the transfer track on the tape. In the readout mode, a signal on the pass track and the absence of a signal on the layout track will cause a signal to be recorded on the transfer track which is used during the record mode to enable data to be transferred from the input data storage means to the data tracks on the tape. On the other hand, if a data space previously had data recorded thereon, the presence of both a pass signal and a layout signal in the readout mode causes the absence of a signal on the transfer track which is used in the record mode in such a manner that even if data are present in the input data storage means for recording, the storage control means will not be enabled during a subsequent pass to record additional data in the occupied data space. The system is described in one embodiment in connection with the recording and display of randomly-generated tomographic data. Thus, randomly-generated data may be compressed in real time for recording in a data storage means, for example, an endless loop tape.

11 Claims, 5 Drawing Figures

| | a | | | | | b | | | | | c | | | | | d | | | | | e | | | | |
|---|---|---|---|---|---|---|---|---|---|---|---|---|---|---|---|---|---|---|---|---|---|---|---|---|---|
| PASS | ① | ② | ③ | ④ | ⑤ | ① | ② | ③ | ④ | ⑤ | ① | ② | ③ | ④ | ⑤ | ① | ② | ③ | ④ | ⑤ | ① | ② | ③ | ④ | ⑤ |
| DATA | ② | | | | | ① | ② | | | | ① | ② | | | | | ② | | | | ① | | | | |
| LAYOUT | ② | | | | | ① | ② | | | | ① | ② | | | | | ② | | | | ① | | | | |
| TRANSFER 2nd PASS | ② | | | | | | | | | | | | | | | ② | | | | | | | | | |
| TRANSFER 3rd PASS | | ③ | | | | | | | | | | | | | | ③ | | | | | | ③ | | | |

PATENTED JAN 22 1974 3,787,827

SHEET 3 OF 3

REAL TIME DATA COMPRESSION SYSTEM

This is a division of application Ser. No. 168,845, filed Aug. 4, 1971.

BACKGROUND OF THE INVENTION

This invention relates to a real time data compression system. More particularly, this invention relates to a system for recording randomly generated input signals on data spaces in a memory storage network. Still more particularly, this invention relates to a system for recording randomly-generated data at data spaces provided in an endless loop tape transport system wherein means are provided for precluding the recording of additional data in spaces where data had previously been recorded.

The prior art has produced a number of data storage and retrieval systems. For example, the art has produced sophisticated networks which utilize drum storage means or endless loop tape transfer means for recording data for convenient retrieval. Such cyclical memory devices are especially useful where the data to be recorded are continuously provided, such as in systems which use digital techniques.

However, where the flow of data to the storage device is random, or otherwise non-continuous for one reason or another, it is a problem in the art to provide a method and apparatus for storing the random data in the data storage means in a manner which efficiently utilizes all of the storage space available. On one hand, a sufficient number of recording devices may be provided and continuously operated to be capable of continuously receiving data even during the time when data are not otherwise available for recording. Thus, such devices will have a number of unoccupied data spaces otherwise available for receiving data.

Where randomly-generated data are recorded on a real time basis, the time required to review such data is ineffectively used because of the possibility of large unoccupied data spaces. In order to resolve this problem, one possibility is to provide a system which utilizes means for starting and stopping the recording means only when data are present. In order to function in this manner, significant circuitry is required to operate in cooperation with a source of input signals to initiate recording only when such signals are present. These devices run the risk that data will be lost either through failure of the system to respond satisfactorily or as a result of the inherent dynamics of such systems.

Thus, the art has provided a number of input storage systems for temporarily storing input data to be read out upon command. Such data may be read out on a repetitive periodic basis or when the input storage networks are approaching capacity. When data are repetitively read out, the possibility remains that a significant number of data spaces which are devoid of data will be present in the data storage network. Thus, while the problem is alleviated to some extent, such systems remain subsequentially inefficient in that all data spaces in the recording network may not be used. Where input data storage networks are read out when approaching capacity, means must be provided for monitoring the input storage network to prevent providing additional data to saturated recording networks and destroying the significance of the recorded data.

Another solution to the problem of recording randomlygenerated data is to record the data in real time and subsequently select recorded data for rerecording on a compressed basis. It is apparent that such rerecording operations are inherently time consuming and require a significantly complex additional step to insure that no data is lost.

The use of endless loop tape transport systems has provided an attractive possibility for the recording of data, but are subject to the problems set forth above. Thus, when endless tapes are used to record data, it continues to be a problem in the art to effectively utilize all of the data spaces available on the length of the tape for the recording of data. Otherwise, as indicated above, significant spaces devoid of data are provided which materially lengthen the readout time. Thus, it is an aim of this invention to provide a real time data compression system particularly suited for use in recording randomly-generated analog data on an endless tape.

Thus, it is a primary object of this invention to provide a method and apparatus for compressing recorded data on a real time basis.

It is another object of this invention to provide a real time data compression method and apparatus which utilize an endless tape as the data storage means.

It is an additional object of this invention to provide a method and apparatus for compressing randomly-generated data for storage in an endless loop tape transport system.

It is an additional object of this invention to provide a method and apparatus for recording randomly-generated analog data on an endless tape which further includes means for precluding the recording of analog data in an occupied data space.

It is an additional object of this invention to utilize a multi-track tape divided into a plurality of data spaces and utilizing a number of tracks of the tape to generate a representation as to whether a particular data space is occupied to preclude recording of additional data at that space.

It is an additional object of this invention to provide a method and apparatus for use with an endless loop tape having a plurality of data spaces which indicate that a particular data space is occupied and which precludes the recording of additional data at that space.

These and other objects of this invention will become apparent from a review of the accompanying written description of the invention taken in conjunction with the accompanying drawings.

BRIEF DESCRIPTION OF THE INVENTION

Directed to overcoming the shortcomings of the prior art and achieving the aforestated objects, this invention in its preferred embodiment comprises a data storage system which includes an endless loop tape transport network wherein a multitrack tape is divided into a plurality of data spaces. A plurality of tracks are used for recording data, while the remaining tracks contain information which is used to monitor and control the recording of data on the data tracks. The remaining tracks are the clock track, layout track, pass track, and transfer track. Recording and readout means are provided for the tape. A source of input signals,for example, randomly-generated signals, are temporarily stored in an input data storage network. A clock signal, for example, 500 khz is recorded on the clock track of the tape. The clock signal is read out from the tape to provide a lower frequency pass signal, for example, at 1 khz, to divide the tape into a plurality of data spaces by recording a pass signal on the pass track of the tape. When data is available in the data storage means for recording, a signal is provided to a gate network which is enabled when a data transfer signal is received. When the gate is enabled, the storage control means releases data from the data storage means for recording on a plurality of data tracks on the tape. When data are thus recorded, a signal is also recorded on the layout track of the tape.

The transfer signal is recorded on the transfer track of the tape during the readout mode. The pass signal indicating the presence of a data space and the layout signal indicating the data had been recorded at that data space are used in such a manner that no signal is generated on the transfer track. Thus, on subsequent passes of the tape, and in the absence of a signal on the transfer track, the gate means are not enabled to record data at the unoccupied data space. When the layout track has no signal recorded thereon, indicating that no data has been recorded in a particular data space, the pass signal and the absence of a layout signal cause a signal to be recorded on the transfer track so that the storage control means may be enabled if data are present to record data at that data space.

The method and apparatus of the invention are particularly suited for compressing randomly-generated analog signals in real time. In one embodiment, tomographic data are provided as the input data for display as compressed on an output oscilloscope.

DETAILED DESCRIPTION OF THE PREFERRED EMBODIMENT

Figure 1:
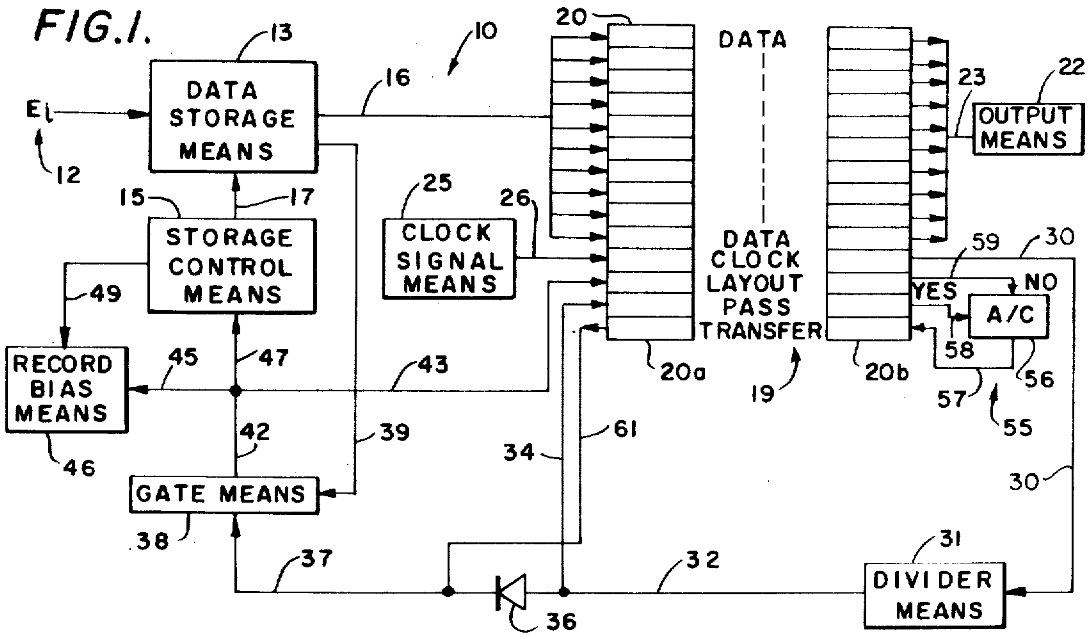
FIG. 1 is a block diagram of the apparatus according to the invention.

In FIG. 1, a system for recording and reproducing data is designated generally by the reference numeral 10. The system 10 comprises a source of data designated in the drawings as $E_i$ and by the reference numeral 12 for providing data to an input data storage means 13. The input signals 12 may be either analog or digital signals. In the preferred embodiment, however, the input signals 12 are randomly-generated analog signals having a range of approximately plus or minus 1 volt. Moreover, the input signals 12 may represent data developed from a plurality of individual random events. Thus, it is a feature of the system according to the invention that it is especially adapted to accommodate random data and to compress the data for storage on a real time basis.

The input data storage means 13 receives the data 12 for temporary storage and subsequent recording and preferably comprises a plurality of linear gates in which the storage of input data and the readout of the stored data is under the control of a storage control means 15. Thus, data from the input data storage means 13 may be read out on channel 16 when an enabling signal appears on lead 17 from the data storage control means 15. A suitable input data storage means 13 is known in the art as an input data buffer and comprises a plurality of gates which are enabled according to a predetermined sequence by a storage control means 15.

Means for recording and reproducing the data from a channel 16 are designated generally by the reference numeral 19 and comprise an endless loop tape 20 in an endless loop tape handling system. The system has a recording position designated by the numeral 20*a* and a reproducing position designated by the numeral 20*b*.

A specific example of a suitable tape handling network for use in the invention utilizes a one inch magnetic tape having fourteen tracks thereon. In this embodiment, ten of the tracks are available for receiving data for recording from the channel 16 while the remaining four tracks contain information used to monitor and control the recording of data on the tape. These four tracks, for purposes of this description, will hereafter be termed the clock track, the layout track, the pass track, and the transfer track. Similarly, the signals on these four tracks will hereafter be designated as the clock signals, layout signals, pass signals and transfer signals respectively. The number of data tracks which are necessary is a function of the particular system. For this exemplary embodiment, the system is capable of monitoring ten aspects of an event, where the data on one track are laid down in synchronism with data on the other data tracks.

The data recorded on the ten data tracks of tape 20 at position the recording 20*a* are reproduced by the tape transport system at the reproducing position 20*b* when desired to provide a suitable output representation at an output means designated by the numeral 22 from an output channel 23. In a conventional 14-track endless loop tape handling system, a pair of spaced record heads may be used where one of the record heads provides signals for seven of the fourteen tracks, while the other record head provides recording signals for the other seven tracks. Similarly, a pair of reproduce heads may be used where each of the reproduce heads is responsible for reproducing the signals on seven of the tracks. The number of record and reproduce heads is not critical so that the multi-track and recording and reproducing functions may be accomplished with single heads if desirable.

The system 19 according to the invention, however, is arranged so that all but one of the tracks of the tape 20 in position 20*a* is in the record mode while one track, i.e. the transfer track, is in a reproduce mode. On the other hand, all of the tracks of the tape 20 at position 20*b* are in a reproduce mode except for the transfer track which is in a record mode. The reaons for this arrangement will be apparent in this description.

The record position 20a and the reproduce position 20*b* are determined by the endless loop tape transport system which is used. For example, the record position 20*a* could be adjacent the reproduce position 20*b*, or the respective positions could be located at opposite sides of the endless loop track. In any event, the principles of the invention apply to the endless loop for any location of the record and reproduce positions.

Clock signal means 25 are provided to produce a clock signal on lead 26 to record that signal on the clock track of the tape 20 at position 20*a*. The frequency of the clock signal from the clock signal means 25 is a function of the random input rate of the data provided to the data storage means 13. For purposes of illustration, however, the system will be described in connection with a 500 khz clock signal reproduced on the clock track of a 60 feet loop of tape passing at 120 inches per second, so that the tape makes one complete pass in 6 seconds. Thus, in this embodiment, $3 \times 10^6$ clock pulses are produced on the clock track when a 500 khz clock signal is used. Preferably, the signal is recorded on the clock track prior to the first pass of the tape 20 for receiving data on channel 16 from the data storage means 13. By prerecording the clock signals on the clock track in this manner, the clock source 25 need not be operated during a recording cycle. Moreover, the clock signals may be laid down on the tape 20 at any convenient time prior to recording data.

Figure 2:
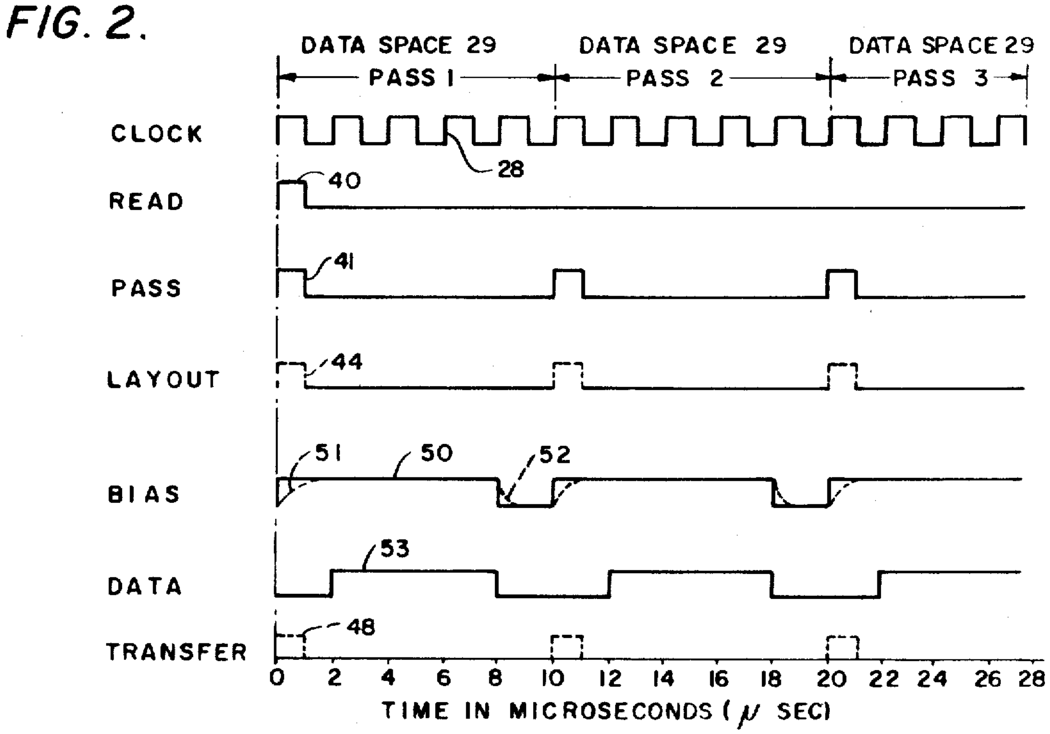
FIG. 2 is illustrative of the various signals in the apparatus of FIG. 1 plotted as a function of time.

The signals recorded on the clock track of the tape 20 at position 20*a* are shown in FIG. 2 by the curve 28. At a clock rate of 500 khz, the clock signals reproduce every two microseconds, so that the pulse duration is one microsecond, spaced apart by about a one microsecond off period as shown by curve 28.

It is convenient when practicing the invention to divide the length of tape 20 into a plurality of data spaces 29 having a duration equal to a predetermined number of clock pulses. The data spaces are shown in FIG. 2 as having a duration of ten microseconds, equivalent to dividing the tape into a data space for every five pulses. To divide the length of the tape 20 into a plurality of data spaces 29, the signal on the clock track is read out at the reproduce position 20b to provide that clock signal on lead 30 to a divider network 31. The rate of the division of the clock frequency is preferably a function of the random input rate of the input data to the data storage means 13. For brain scans, by way of a particular example, a division by 500 has been satisfactory, so that the output signal on lead 32 from the divider means 31 is at a frequency of 1 khz. Thus, a, hereinafter called a pass signal pulse is produced on lead 32 for every 500 pulses on the clock track.

The data spaces 29 of the duration desired are determined by repetitively cycling the tape through the system while controlling the start position of the recording of the pass pulse for each cycle. By repeatedly delaying the first pass pulse of each cycle for the length of time of the data space, e.g. ten microseconds, the tape is divided into a plurality of data spaces. Other suitable techniques may also be used to divide the tape into data spaces.

To record the pass signal, which as been derived by a frequency division of the clock signal, the signal on lead 32 is provided on lead 34 to be recorded on the pass track of the tape 20 at the recording position 20*a*. Thus, each pass signal indicates the presence of a data space having a predetermined length, e.g. 10 microseconds as shown in FIG. 2.

When a read signal, designated in FIG. 2 by the numeral 40 appears on lead 37 in response to a transfer command signal, which will be discussed, and a signal appears on lead 39 indicating that data for recording are present in the input data storage means 13, the gate means 38 is enabled.

The gate means preferably comprises an AND gate and provides a pulse therefrom on lead 42. The pulse on lead 42 is provided on lead 43 to be recorded on the layout track of the tape 20 at position 20*a*. The position of the layout pulse is designated in FIG. 2 in a dotted outline of the reference numeral 44 to indicate that a layout pulse may be indicated at that time. However, if no data are available for recording from data storage means 13, no signal will appear on lead 39 so that no signal will appear at that position on the layout track. Thus, the layout signal appears on the layout track of the tape only when the gate 38 has been enabled and indicates that data are recorded at that data space on the tape.

The signal from the enabled gate 38 on the lead 42 is also provided on lead 45 to a record bias means 46 and to the storage control means on lead 47. The storage control means provides a signal on channel 49 to control the bias for the record heads in the record position 20a of the tape system 19. At the same time, the storage control means 15 provides a signal on channel 17 to the input data storage means 13 to control the readout of data on channel 16 to be recorded on the data tracks of the tape 20.

When the record bias means is operative, a bias signal designated by the numeral 50 in FIG. 2 is generated. However, since the bias has a finite increase time and a finite decrease time as designated by the dotted curves 51 and 52 respectively, it is preferred that the data be read out from the data storage means 13 on channel 16 for a lesser period of time as shown in FIG. 2 by the curve 53. Thus, for each data space of 10 microseconds, 6 microseconds are available for data recording. Thus, the operation of the circuit in FIG. 1 during the first pass of the tape 20 has been described.

Under the condition in which the data storage means did not have data for recording, a number of empty ten microsecond spaces may occur on the tape in which no data has been stored. Thus, it is an important aspect of the invention to provide for indicating empty spaces on the tape so that these spaces may be filled by the data when available. Since a pass pulse 41 indicates the presence of a data space on the tape, and a layout pulse 44 indicates whether data have been stored in that space, the pulses 41 and 44 may be used to provide an indication of whether that space is available. Thus, means are designated by the reference numeral 55 in FIG. 1 for receiving the pass signal and the layout signal in a logic cirucit 56 to provide a transfer signal on lead 57 to record a signal on the transfer track at the readout position 20b under certain conditions. A signal from the pass track at the readout position 20b will be provided on lead 58 to the logic circuit 56 and if no signal appears on lead 59 from the layout track, a signal will will be provided from the logic circuit 56 on lead 57 to the transfer track. A signal on the transfer track will thus be used to indicate an available data space. On the other hand, the presence of a layout signal indicates that the data has been recorded in that data space of the tape so that no pulse is produced on lead 57 and no signal is recorded on the data track in position 20*b*. Thereafter, on the subsequent passes, no pulse from the transfer track at position 20*a* is read out, and no signal is provided on lead 61. Thus, no signal will appear on lead 37 from lead 61 to enable the gate means 38 even if data is otherwise available for storage in the data storage means 13 as indicated by a signal on lead 39.

Preferably, the pass pulses are prerecorded on the tape, for example, at the time the clock pulses are recorded. After the pass pulses are recorded, the pass pulses operate only to indicate the presence of a data space and to act in conjunction with the layout signal to control the recording of a transfer signal at tape position 19*b*.

In FIG. 2, the layout signal 44 is shown in phantom to indicate that data if available could be recorded as shown by curve 53 in a data space. Similarly, transfer pulses 48 are shown responsive to the layout pulses.

Figures 3, 4:
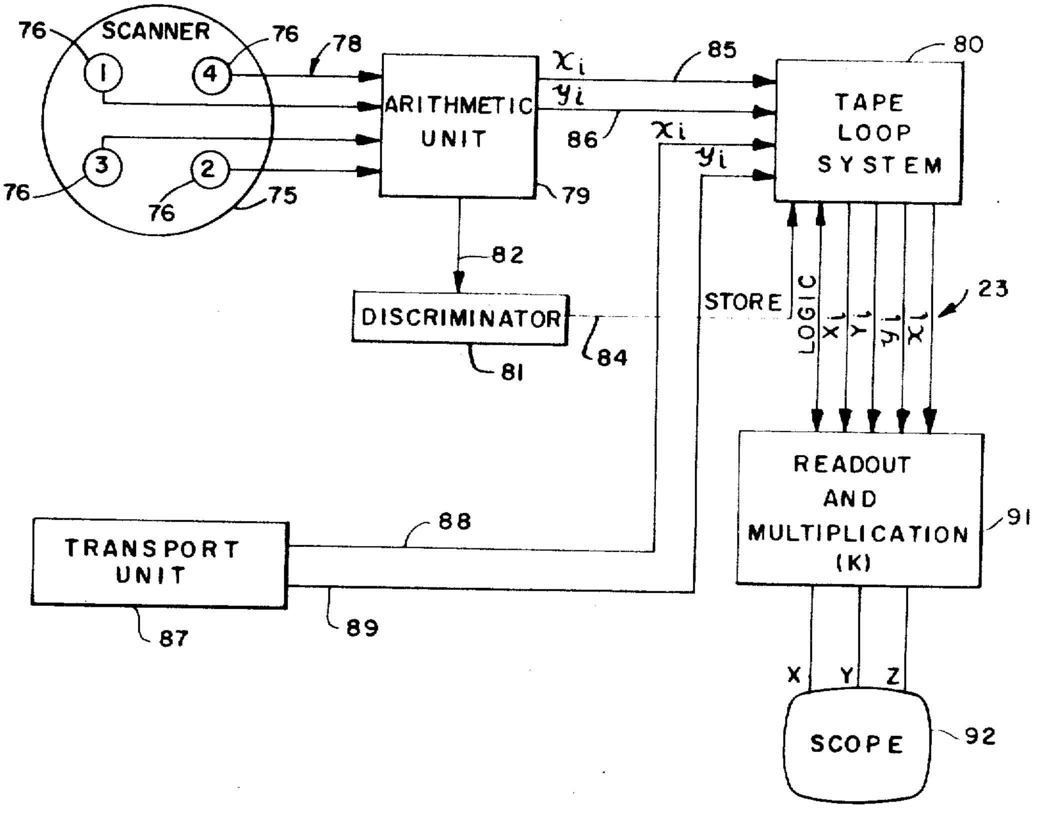
FIG. 3 is a diagram for use in explaining the operation of FIG. 1 for several passes.
FIG. 4 is a block diagram of the system of FIG. 1 when used in conjunction with a scanner for generating tomographic data and for reading out data on an oscilloscope.

The chart in FIG. 3 describes the operation of the tape system of FIG. 1 for a number of passes. In this embodiment, a plurality of data spaces are designated generally by the letters *a–e*. Each of the data spaces *a–e*, for purposes of illustration, may be considered to be divided into five data subspaces. For the recording technique previously described, FIG. 3 may be understood to illustrate the situation where the circuit of FIG. 1 operates to make available for recording each data subspace bearing a like numeral on a given pass of the endless tape. Thus, as the tape passes through the tape transport system, the first data subspace 1 for each data space *a–e* is available for recording on the first pass of the tape, the data subspace 2 for each data space a-e is available for recording for the second pass and so on. If data were available continuously, it should be understood that it would require five passes of the tape to completely fill each of the data subspaces 1 through 5 within the data spaces *a–e*.

By way of example, suppose that no data are provided in data subspace 1 in spaces a and d on the first pass, but that data are recorded in data subspace 1 in data spaces *b*, *c*, and *e*. This condition is demonstrated by the designation in the row labeled "data" by the numeral 1 under the subspace 1 in each of spaces *b*, *c*, and *d*.

On the second pass of the tape, all of the data subspaces labeled 2 are available for receiving data, as well as the data subspaces in the first pass which received no data, i.e. *a* 1 and *d* 1 (the only spaces under 1 not bearing the numeral 1). Because data spaces *a* 1 and *d* 1 are also available for receiving data on the second pass, the transfer track in the "1" space is so marked as indicated by the numeral 2 in the row entitled "Transfer 2nd Pass." For purposes of illustration, suppose that on the second pass of the tape, data is stored in data subspace a 1 designated by the numeral 2, as permitted by the presence of a transfer signal at that space, but no data are stored in data subspace *d* 1. Thus, the transfer signals on the third pass demonstrate that data spaces *a* 2, *d* 1, and *e* 2 are available for receiving data during the third pass of the tape, as well as all the data subspaces *a* 3 – *e* 3 respectively. By consecutively causing the tape to pass through the system in this manner, each of the data subspaces which were not used in previous transfers are available for the recording of data in subsequent transfers.

FIG. 4 indicates in block form the application of the invention to a system for recording randomly-generated data, such as tomographic data. A head, designated generally by the reference numeral 75 includes a plurality of photomultiplier tubes 76 which generate analog data on the leads designated generally by the numeral 78 to an arithmetical unit 79. By way of a specific example, the head may be disposed facing a scintillator which emits a signal of visible light in response to incident radiation, for example, a gamma ray. Such a device is described generally in the Anger patent, U.S. Pat. No. 3,011,057, issued Nov. 28, 1961, the disclosure of which is incorporated by reference.

A discriminator 81, for example, a pulse height analyzer receives a signal representative of the pulse height of the analog signals generated on leads 78 on lead 82. When the discriminator 81 indicates that the magnitude of the signals sensed by the head 75 is of interest, a signal is provided on lead 84 to the tape loop system 80 which embodies the apparatus shown in FIG. 1 to command the storage of data in the input storage means 13. In FIG. 4, the input signals are designated by $x_i$ and $y_i$ on leads 85 and 86 respectively. That designation is used to indicate that the signals on leads 85 and 86 are referenced to a predetermined coordinate system to indicate the output of the head 75 when weighted according to a predetermined arithmetical relationship in the arithmetic unit 79. The head transport unit designated generally by the reference number 87 also generates analog signals $X_i$ and $Y_i$ of the position of the head 75 on leads 88 and 89 to the tape loop system 80. The input storage means 13 stores the data from leads 85, 86, 88 and 89 in accordance with the description of FIG. 1.

The data from the loop system is read out on channel 23 to a readout and multiplication circuit 91 for display on an oscilloscope 92 in accordance with the teachings of the Anger patent. The effect of the readout and multiplication unit 91 is to act as a computing circuit to report the precise location of each scintillation in relation to the predetermined coordinate system in the scintillator. The output signals from the unit 91 are applied to a cathode ray oscilloscope 92 to deflect the beam thereof and to make a spot on the screen at a spot corresponding to the location of the original scintillation in the scintillator, according to the method described in the Anger patent. Thus, the oscilloscope displays an image of the radiation source with each desired scintillation plotted.

Figure 5:
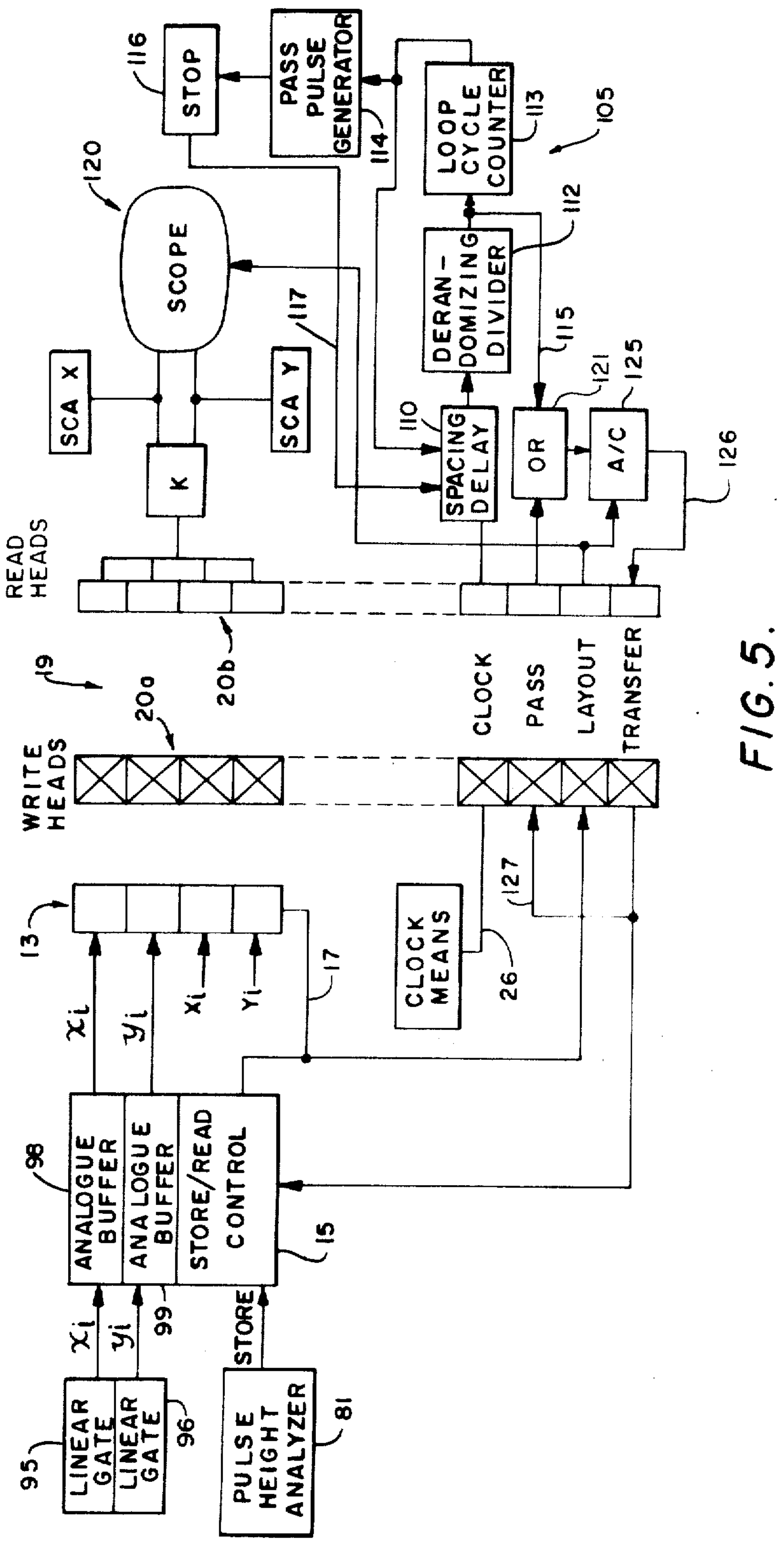
FIG. 5 is a block diagram in greater detail of an apparatus according to the invention.

The details of the system of the embodiment shown in FIGS. 1 and 4 are shown with greater specificity in FIG. 5. Where applicable, like reference numerals are used to refer to the components described in connection with those figures. It should be noted in FIG. 5 that the outputs from the arithmetic unit 79 are passed through a linear gate 95 for the X coordinate of the average random input data, and the linear gate 96 for the Y coordinate of the average random input data. These data are provided to the analog buffers 98 and 99 respectively which are included within the data storage means 13 described in FIG. 1. As indicated, the pulse height analyzer 81 causes the store and read control 15 to command the buffers 98 and 99 to store data of interest which are caused to be read out onto the data tracks on the tape as indicated in FIG. 1.

In FIG. 5, the gate means 38, the record bias means 46, and the storage control means are referred to as the store and read control circuit, but preferably operate in the manner described in connection with FIG. 1. Similarly, the input data storage means 13 is designated generally but may also include the buffers 98 and 99. As indicates, in the description of FIG. 1, the input data storage means 13 releases data from the storage upon command by a signal on lead 17.

The operation of the clock, pass, layout and transfer signals to cause readout from the storage control circuit and from the input data storage means has been described in connection with FIG. 1. In addition, the operation of the readout display circuit designated generally by the numeral 120 in connection with FIG. 4 has been described and is described in greater detail in the Anger patent.

As shown in FIG. 5, in block diagram, the clock signal on the clock track of the tape may be used to provide the spacing delay previously described for generating spaced data spaces on the tape. The clock signals are provided to a spacing delay circuit 110 which operates by passing a predetermined number of pulses in accordance with the desired delay at the end of each pass to offset the data spaces in each subsequent cycle.

The output from the spacing delay circuit is provided through a divider circuit 112 which is in circuit with a loop cycle counter 113. The output from the loop cycle counter is provided to a pass pulse generator 114. The divider 112, the counter 113 and the pass pulse generator 114 are divider circuits to count effectively the number of pulses disposed over one length of the tape. When one length of the tape has passed, the pass pulse generator 114 enables the stop circuit 116 to generate a signal on lead 117 to enable the spacing delay 110 to delay the initiation of the pulse count on subsequent tape passes. For example, on the first pass of the tape, the loop cycle counter 113 will indicate that the tape has made one complete revolution. The circuit 113 will generate a signal to enable the pass pulse generator 114 to provide a pulse from the stop circuit 116 on the lead 117 to the delay circuit 110 to delay the generation of the pass pulses on the tape for a predetermined number of counts in the manner previously described in connection with FIGS. 1 through 3.

The data spacing on a tape is generated by using the pass pulses previously placed on the pass track of the tape to which are added the output pulses from the divider 112 through an OR circuit 121. Thus, the tape is divided into a plurality of data spaces by consecutively passing the tape through the circuit in cooperation with the spacing delay circuit previously described. For example, when the process for generating discrete data spaces on the tape is initially started, the pass track contains no pass pulses. On the first pass, the divider 112, which corresponds to the divider 41 in FIG. 1 causes a signal to be generated from the OR gate 121 to a logic circuit 125 to lay down a signal on the transfer track by way of lead 126. That signal is transmitted to the pass track on lead 127 during the record cycle. On the second pass, the pass track will contain a number of pass pulses representing, for example, the pass pulses designated in the spaces identified by the numeral 1 in FIG. 2. During the second pass, which has been spaced from the first pass by the delay circuit 110, the divider circuit again provides a pass signal on lead 115 through the OR gate to provide a signal to the logic circuit 125 to be transferred to the pass track as previously described. By repetitively passing the tape in this manner, the tape is divided into a plurality of data spaces which contain a plurality of data subspaces for operation as described in connection with FIGS. 1 through 3. This circuit designated generally by the reference numeral 105 is one illustrative embodiment of the manner by which the tape may be divided into a plurality of data spaces according to the invention.

Thus, a data compression network suitable for use in connection with randomly-generated analog data has been described.

Additional background information regarding a potential use of the apparatus according to the invention may be found in an article by H.O. Anger, "Multiplane Tomographic Gamma-ray Scanner," Medical Radioisotope Scintigraphy: Proceedings of a Symposium on Medical Radioisotope Scintigraphy Held by the International Atomic Energy Agency in Salzburg, 6–15, August 1968, Vol. 1, pp. 203–216 (1969), the disclosure of which is incorporated by reference.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An endless loop tape transfer system comprising:

a multichannel magnetic tape comprising a plurality of information and control channels, means for recording a clock signal in one of the control channels, means for recording a first control signal in another channel, said first control signal being indicative of a data space and being derived from said clock signal;

means responsive to said first control signal and the absence of a second control signal to generate a third control signal, said third control signal being indicative of a data space, means responsive to said third control signal and a data input means to enable recordation at said data space and to generate said second control signal which also indicates that data has been stored at that data space.

2. The system as set forth in claim 1 wherein one of said control channels on said tape is further characterized as a transfer track for receiving said third control signal characterized as a transfer signal, said transfer signal being determined by said second control signal characterized as a layout signal and said first control signal characterized as a pass signal indicating the presence of said data space.

3. The system as set forth in claim 2 wherein said tape includes means for recording on said channels and means for reproducing from said channels, and wherein said means for generating said transfer signal is responsive to said reproducing means of said tape.

4. The system as set forth in claim 2 wherein one of said control channels on said tape is characterized as a clock track for containing said clock signal, said clock signal being capable of being divided to provide said pass signal to divide said tape into a plurality of data spaces.

5. The apparatus as set forth in claim 4 further including means for generating said pass signal from said clock signal.

6. The system as set forth in claim 1 further including:

a source of input signals, input data storage means for temporarily storing said input signals, and data release means for causing said input data storage means to release said input data to said information channel upon command in response to said transfer signal.

7. The system as set forth in claim 6 wherein said release means includes gate means responsive to a signal from said input data storage means to indicate that data are present for recording and for receiving said transfer signal to enable said data storage means to release said data for on said information channels.

8. The system as set forth in claim 7 wherein said data release means includes storage control means in circuit with said input data storage means for controlling the biasing of record heads in said recording means and for causing said input data storage means to release said data.

9. The system as set forth in claim 1 wherein said input signals are randomly varying analog input signals.

10. The system as set forth in claim 9 wherein said input signals are derived from a scintillation scanning unit and further includes readout means in circuit with said tape, said readout means including an oscilloscope.

11. The system as set forth in claim 2 further including means for delaying the initiation of the pass signal on said pass track for a predetermined number of counts on subsequent cycles.

* * * * *